(12) United States Patent
Sukhman et al.

(10) Patent No.: US 6,181,719 B1
(45) Date of Patent: Jan. 30, 2001

(54) GAS LASER RF POWER SOURCE APPARATUS AND METHOD

(75) Inventors: Yefim P. Sukhman, Scottsdale; Mikhail E. Ryskin; David W. Schultz, both of Phoenix; George M. Mavroleon, Fountain Hills, all of AZ (US)

(73) Assignee: Universal Laser Systems, Inc., Scottsdale, AZ (US)

( * ) Notice: Under 35 U.S.C. 154(b), the term of this patent shall be extended for 0 days.

(21) Appl. No.: 09/198,910

(22) Filed: Nov. 24, 1998

(51) Int. Cl.[7] .................................................... H01S 3/00
(52) U.S. Cl. ............................................................ 372/38.1
(58) Field of Search ............................................. 372/38

(56) References Cited

U.S. PATENT DOCUMENTS

| | | |
|---|---|---|
| 2,531,103 | 11/1950 | Beckwith . |
| 3,593,189 | 7/1971 | Buhrer . |
| 3,626,330 | 12/1971 | Zalonis . |
| 3,729,688 | 4/1973 | Cerny . |
| 3,790,852 | 2/1974 | Bolin . |
| 3,965,440 | 6/1976 | Graves . |
| 4,169,251 | 9/1979 | Laakmann . |
| 4,363,126 | 12/1982 | Chenausky . |
| 4,373,202 | 2/1983 | Laakmann . |
| 4,383,203 | 5/1983 | Stanley . |
| 4,451,766 | 5/1984 | Angle . |
| 4,455,658 | 6/1984 | Sutter . |
| 4,748,634 | 5/1988 | Hesterman . |
| 4,809,284 | 2/1989 | Chenausky . |
| 4,833,681 | 5/1989 | Akiyama . |

(List continued on next page.)

FOREIGN PATENT DOCUMENTS 1093538 12/1967 (GB) .

OTHER PUBLICATIONS

Morley, R.J., "Mode and Frequency Control of Compact $CO_2$ Slab Lasers Through Intra-Cavity Cohert Imaging". Applied Optics, vol. 34, No. 3, Jan. 20, 1995, pp.,418–425.
Synrad, Inc., "Series 48 Lasers Operation and Service Manual", Release v. 2.0, Oct. 18, 1995, p. 10.

*Primary Examiner*—Teresa M. Arroyo
*Assistant Examiner*—Gioacchino Inzirillo
(74) *Attorney, Agent, or Firm*—Donald J. Lisa

(57) ABSTRACT

A gas laser RF power supply has two RF oscillators operating at different frequencies, the first frequency to provide maximum RF voltage to the plasma tube prior to ignition, and the second frequency to provide optimum power for sustaining CW or pulse operation of the laser. The oscillator outputs are modulated to control power to the tube, the one in the form of RF pulses at the first frequency and at a power level below the laser emission threshold, and the other in CW or pulse form at the second frequency at a laser gas medium excitation level above the laser emission threshold. The first frequency is the resonance frequency of the tube prior to plasma ignition and the frequency of minimum average RF power required for a reliable ignition. The second frequency is the most efficient operating frequency for the plasma ignited and kept ionized by the pulses of the first frequency and provides maximum output laser power. The pulses of the first frequency have a width, repetition rate, and amplitude sufficient to obtain a reliable ignition and sustain a level of the laser gas medium excitation below the laser emission threshold and are also adjustable to compensate for variations in the laser emission threshold for a particular tube-resonator combination. The oscillators may have a fixed or adjustable frequency. The RF amplifier input is switched between the outputs of the two oscillators by switching logic which also couples to a source of main laser power control pulses which inhibit the modulated RF pulses of the first frequency when the main pulses are present and which are also used to modulate the RF pulses of the second frequency to obtain the desired laser output power.

28 Claims, 4 Drawing Sheets

U.S. PATENT DOCUMENTS

| | | |
|---|---|---|
| 4,837,772 | 6/1989 | Laakmann . |
| 4,856,010 | 8/1989 | Wissman . |
| 4,891,819 | 1/1990 | Sutter . |
| 4,893,353 | 1/1990 | Iwaoka . |
| 5,008,894 | 4/1991 | Laakmann . |
| 5,135,604 | 8/1992 | Kumar . |
| 5,150,372 | 9/1992 | Nourrcier . |
| 5,475,703 | 12/1995 | Scalise . |
| 5,479,428 | 12/1995 | Kuzumoto . |
| 5,528,613 | 6/1996 | Macken . |
| 5,549,795 | 8/1996 | Gregoire . |

GAS LASER RF POWER SOURCE APPARATUS AND METHOD

BACKGROUND OF THE INVENTION

1. Fields of the Invention

The present invention relates generally to an apparatus for and a method of applying a radio frequency power supply to ignite a gas laser and operate it, and, more particularly, to such a supply which uses multiple, independent RF generators to provide different frequencies which enable optimal performance of each operation of the gas laser.

2. Discussion of Background And Prior Art

In order to obtain good performance of a $CO_2$ gas laser with RF excitation, the RF power supply has to provide a high ignition voltage to the electrodes of the plasma tube to ignite the discharge in a laser gas mixture and, after ignition, it must provide high RF power to sustain the laser radiation output. These two independent conditions (maximum ignition voltage and maximum power) are difficult to achieve in actual practice because both ignition voltage and RF power depend on the output impedance of the power supply and the impedance of the tube. To further complicate the issue, the impedance of the tube is different for the two states of the tube (discharge ON and discharge OFF). Thus, once the RF power supply is tuned to provide maximum ignition voltage, the RF power would not be a maximum and vice versa. FIG. 1.

From an electrical point of view, the conventional tube for the laser with RF excitation is a resonant circuit with a capacitance and an inductance associated with the electrodes, and the ignition of the discharge is the equivalent of adding a resistance and a capacitance to the circuit. As a result, the impedance of the tube is lower with the discharge ON than it is with the discharge OFF, and the resonance frequency of the tube when the discharge is ON is about 1–3 MHz lower than the resonance frequency of the same tube when the discharge is OFF. These issues make the problem of the design of the RF power supply a difficult one. As described in greater detail below, numerous attempts have been made in the prior art to solve these complex problems.

a. Optimal Power Transfer At The Operating Frequency

To deliver the optimum power to the gas laser discharge the impedance of the oscillator output circuit should be matched to the impedance of the plasma discharge at its operating frequency. In U.S. Pat. No. 4,343,126 Chenausky taught that when the discharge is made a tuned circuit as by coupling a coil between the electrodes, and if the real (ohmic) impedance of the discharge is matched to the output impedance of the driving oscillator while the imaginary (reactive) impedance of the tube is canceled by careful choice of the coil, then, in that case, the optimal operating frequency is a frequency about 3% lower than the resonant frequency, and continuous operation at this lower non-resonant optimal frequency is characterized by a great increase in the power transferred to the discharge.

b. Dual Impedance Matching

However, as pointed out above, there is a significant difference in conditions of the laser plasma after plasma breakdown compared to before plasma breakdown. This difference manifests itself in the large decrease in the laser plasma tube impedance after plasma ignition. Importantly, an RF excited $CO_2$ laser will not readily ignite if the rf excitation is initially applied at the frequency and power level which is optimal for full power continuous operation. Nourrcier U.S. Pat. No. 5,150,372 ("Nourrcier")

In an early attempt to solve the problem of requiring a much higher starting or ignition voltage than is required for normal operation or running, Sutter proposed in U.S. Pat. No. 4,455,658 using a power source having dual fixed element impedance matching circuits that have each been adjusted to provide a compromise between a first impedance match required for efficient, steady operation and a second impedance matching device coupling the electrodes to cancel the pre-ignition reactive impedance of the elongated chamber best for applying a high starting voltage to the electrodes. However, in actual practice, such compromise circuits cannot be optimized for either starting or efficient running.

As a proposed solution to this limitation, in U.S. Pat. No. 4,451,766 Angle ("Angle") attempted to provide an RF power supply that provides a high voltage for starting and also an impedance match between the power supply and the gaseous medium of the laser for high efficiency of energy transfer during steady state operation, by providing a variable impedance matching circuit controlled by a feedback voltage applied to a varactor diode. However, while this approach gives good performance at low RF power levels, it is unreliable at high RF power levels when the RF voltage on the veractor exceeds 300–500 volts.

c. Low Energy Ignition Pulses And High Energy Emission Pulses At The Same RF Frequency A further proposed solution to control laser output power in a system which uses pulse-width modulation of the RF power applied to the laser plasma tube is discussed in *Series 48 Lasers, Operation and Service Manual*, (Synrad, Inc.), Release v. 2.0, Oct. 18, 1995, page 10 ("Synrad"). In order to shorten the delay between a user's ON command pulse and laser emission, Synrad delivers a short 1 $\mu s$ ignition pulse, having an energy level just below the laser emission threshold, at a 5 KHz pulse repetition rate which pre-ionizes the laser gas and a wider pulse thereafter which adds enough energy to the plasma to cause laser emission. This method allows the laser to respond predictably and almost instantaneously to the user's command signal. The problem with this approach is that the radio frequency of the short pulse is the same as the radio frequency of the long pulse so the ignition and operation of the laser are not optimized.

Thus, due to the inherent compromises necessary to provide two impedance levels matched to the amplifier, the high impedance prior to breakdown, and the low impedance after breakdown, an RF power supply tuned to a single frequency in a traditional implementation simply cannot satisfy optimum conditions for both ignition and pulsed or CW operation of a gas laser.

d. Single Fixed Frequency Generator With Manual Frequency Shifting

In an attempt to provide a multiple frequency power supply as a proposed solution to the problems experienced by Angle, Synrad, and others, Hesterman describes in U.S. Pat. No. 4,748,634 an RF power supply for gas lasers working on one frequency optimized for CW operation of a laser in which, in order to ignite the laser tube, the operating frequency of the single RF generator is momentarily shifted upwardly to the laser resonant frequency by changing the voltage of a variable capacitor in the bias circuit of the crystal oscillator to change the crystal frequency and thereby provide a large transient voltage for the laser ignition while using considerably less starting power.

While this approach is quite good for starting a laser and for CW operation and results in a smaller, lighter, and less expensive power supply, nevertheless, it suffers from low pulse to pulse reproducibility of the laser energy, especially in applications demanding a rapid and random change of pulse rate and pulse width of a laser (e.g., imaging, engraving and material cutting applications). The main reason for such lack of consistency in the pulse mode in this prior approach is the laser tube impedance dependency on the level and duration of the previous pulses.

e. Single Generator With Automatic Frequency Shifting Feedback Loop

Peter Laakman tried to solve Angle's problem in U.S. Pat. No. 4,837,772 by including the tuned circuit discharge in a circuit path feeding back via a quarter-wave impedance transformer 10% of the output power to the RF frequency power oscillator input which automatically self-adjusted its frequency depending upon the before or after ignition state of the discharge of the laser plasma tube. However, in this case, too, there is still a problem because it requires a very narrow range of the feedback parameters, a requirement that leads to significant difficulties in obtaining maximum efficiency and creates significant manufacturing difficulties.

f. Dual, Voltage Controlled Oscillators ("VCO's") Operating Open Loop On Two Different Frequencies.

An anonymous prior art circuit is described by Nourrcier (1:52–2:23) in which two VCO's connected in the open-loop configuration operate at different RF frequencies, and an RF switch selectively connects the oscillator outputs to the laser at the proper times. In this circuit one VCO initially has an output frequency higher than the igniting frequency and sweeps downwardly past the optimal continuous operating frequency while the other VCO generates the optimal continuous operating frequency. The RF switch connects the first VCO to the laser first for igniting, and then switches out the first VCO and switches in the second VCO after the laser has been ignited. Nourrcier points out the serious problems with this approach, namely, the significant output frequency variation resulting from the temperature drift which afflicts VCO's, and the difficulty in timely effecting switching so as not to let the laser go out as a result of having no RF output or the wrong RF output applied to it.

g. Frequency Sweeping Phase-Locked-Loop Synthesizer

Nourrcier attempted to solve the problems of the Synrad single frequency, pulse-width modulated circuit and of the anonymous two frequency, open loop circuit described above by using an RF power supply having a phase-locked-loop frequency synthesizer providing one frequency optimized for igniting the laser and another frequency optimized for CW operation of the laser. However, as in the anonymous circuit above, to achieve the ignition frequency Nourrcier's synthesizer swept the frequency of the drive signal downwardly from above to the higher resonant frequency optimized for laser ignition and then reverted to the still lower, full power, operating frequency.

While this approach may have solved the timing and temperature drift problems of the anonymous circuit and is quite good for starting a laser and for CW operation, it suffers from low pulse to pulse reproducibility of laser energy due to the laser tube impedance dependency on the level and duration of the previous pulses, especially in laser environments having rapidly changing, unpredictable pulse rates and pulse widths.

Thus, as amply demonstrated above, there is not available today, there is a long felt need for, and it is an object of the present invention to provide, a low cost apparatus and method which applies pulses at a first optimum radio frequency at an energy level below the emission threshold which efficiently ignite the laser gas and keep it ionized until pulses are applied at a second optimum radio frequency at an energy level above the emission threshold level which cause and sustain laser emissions while avoiding all of the problems experienced by the prior art solutions described above.

SUMMARY OF THE INVENTION

Set forth below is a brief summary of the invention which achieves the foregoing and other objects and provides the foregoing and hereafter stated benefits and advantages in accordance with the structure, function, way and results of the present invention as embodied and broadly described herein. Applicants' invention includes independently both the methods and apparatuses described herein which achieve the objects and benefits of the present invention. Both formats of the invention are described below, and it is applicants' intention to claim both formats even though from time to time below for purposes of clarity and brevity applicants will use either one or the other format to describe various aspects and features of the invention.

One aspect of the present invention is an RF excited gas laser including a plasma tube containing electrodes and a laser gas medium, coupled to an optical resonator, and having a laser radiation emission threshold, an RF power amplifier coupled to the electrodes for exciting the laser gas medium, a first frequency oscillator and a second frequency oscillator operating at at least two different frequencies and coupled to the RF power amplifier, the first frequency to provide maximum RF voltage to the plasma tube prior to ignition and the second frequency to provide optimum power for sustaining CW or pulse operation of the laser, a first frequency modulator to control the first frequency oscillator to provide RF power to the plasma tube in the form of RF pulses at the first frequency and at an energy level below the laser emission threshold, and a second frequency modulator to control the second frequency oscillator to supply RF power to the plasma tube in CW or pulse form at the second frequency at a laser gas medium excitation level above the laser emission threshold.

A further feature of this aspect of the invention is the first frequency is the, resonance frequency of the plasma tube coupled to the RF power source prior to plasma ignition and is also the frequency of minimum average RF power required for a reliable ignition of the plasma in the plasma tube.

Further features of this aspect of the invention are the output of the first frequency oscillator is modulated to produce RF pulses with pulse width, repetition rate, and amplitude sufficient to obtain a reliable ignition of the laser gas medium inside the plasma tube and sustain a level of the laser gas medium excitation below the laser emission threshold and which are adjustable to compensate for variations in the laser emission threshold for a particular combination of the plasma tube and the optical resonator.

Still further features of this aspect of the invention are the second frequency may be lower or higher than the first frequency and is also the most efficient operating frequency for the plasma ignited and kept ionized by the pulses of the first frequency thereby providing maximum output laser power.

Still further features of this aspect of the invention are the first and the second frequency oscillators may be fixed frequency oscillators and/or variable frequency oscillators.

Finally, still further features of this aspect of the invention are a switching logic coupled to the outputs of the first and the second frequency oscillators to provide switching between the RF pulses of the first frequency for the plasma ignition with the laser gas medium excitation below the laser emission threshold and the RF pulses of the second frequency with the laser gas medium excitation above the laser emission threshold, a source of main laser power control pulses coupled to an input of the switching logic which inhibit the RF pulses output from the first frequency oscillator when the main laser power control pulses are present, and the second frequency modulator having an input device which uses the main laser power control signals for providing an on/off status to the output of the second frequency oscillator.

A second aspect of the invention is a process of RF exciting a gas laser which includes the steps of housing electrodes and a laser gas medium in a plasma tube coupled to an optical resonator and having a laser emission threshold, coupling the electrodes to an RF power amplifier for exciting the laser gas medium, operating a first frequency oscillator and a second frequency oscillator at at least two different frequencies and coupling the outputs of the oscillators to the RF power amplifier, the first frequency providing maximum RF voltage to the plasma tube prior to ignition, and the second frequency providing optimum RF power for sustaining CW or pulse operation of the laser, controlling the first frequency oscillator by modulating its output for providing RF power to the plasma tube in the form of RF pulses at the first frequency and at an energy level below the laser emission threshold, and controlling the second frequency oscillator by modulating its output for supplying RF power to the plasma tube in CW or pulse form at the second frequency at a laser gas medium excitation level above the laser emission threshold.

Further features of this aspect of the invention are processes which parallel the apparatus features set forth above and are described in greater detail in the detailed description of the invention and the claims set forth below.

The advantages of the invention are as follows:

1. Reliable ignition and maximum laser output power.
2. Independent control of plasma ignition and main laser output power.
3. Improved pulse to pulse repeatability.
4. High power efficiency.
5. Simplified tuning and laser assembly procedure during manufacturing.
6. Reduction in requirements for the reproducibility of the laser tubes.
7. Extended lifetime of the laser tube and the laser RF power supply.
8. Reduction in cooling requirements.
9. Enables manufacture of higher power lasers.

DETAILED DESCRIPTION OF THE PREFERRED EMBODIMENT

Applicants want to emphasize that the circuit configurations shown in FIGS. 2, 4, while they are the best modes known to applicants at the time of filing this application, are merely two of many possible implementations of the broad concepts of the present invention which include an RF power source for use with gas lasers providing optimal conditions for initial plasma breakdown, a continuous low level "simmering" discharge in the laser plasma tube at a power level below the level needed to produce laser output radiation, and a maximum RF power output in a CW or pulsed mode operation of the laser using two different independently controlled RF frequency generators, one f1 (FIG. 3) for providing the low energy ignition pulses (to ignite the discharge), and the other f2 (FIG. 3) for providing the main pulses (to produce laser emissions). By using two independent sources for generating RF frequency pulses for the low energy ignition and for full power operation, applicants are able to optimize both to achieve the best for both processes, that is, for the ignition of the discharge and for producing the laser output.

As is already known in the art, the best frequency for the low energy ignition pulses which provides the most reliable ignition of the discharge should be about 1–3 MHz higher than the frequency of the main pulses which have to provide maximum RF power to the tube.

Technical implementation of the two frequency operation of the present invention may be achieved using either fixed or adjustable RF frequency generators.

Figure 1:
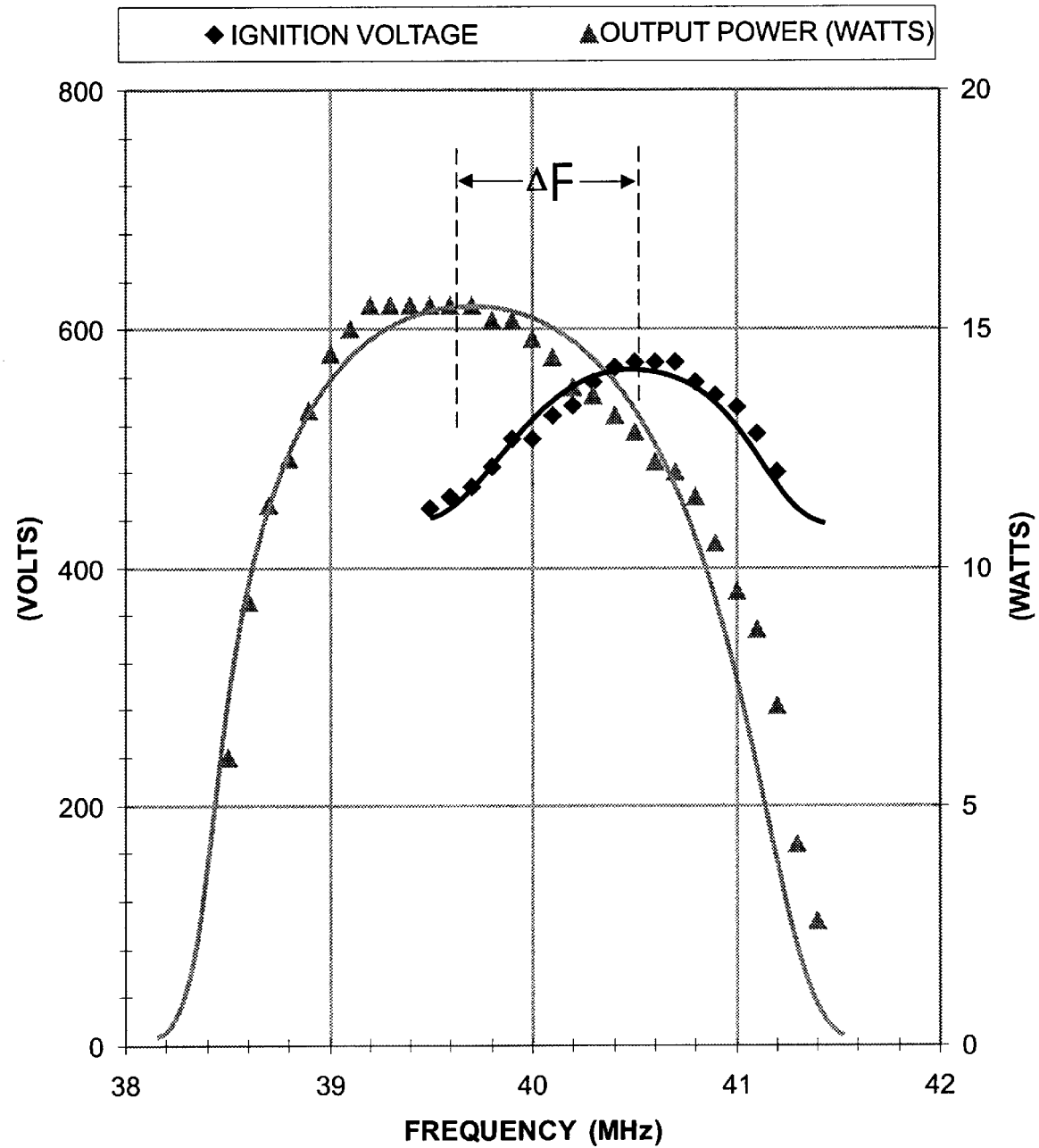
FIG. 1 is a graph of the ignition voltage and the output power as a function of the operating frequency of a typical $CO_2$ gas laser.
Figure 2:
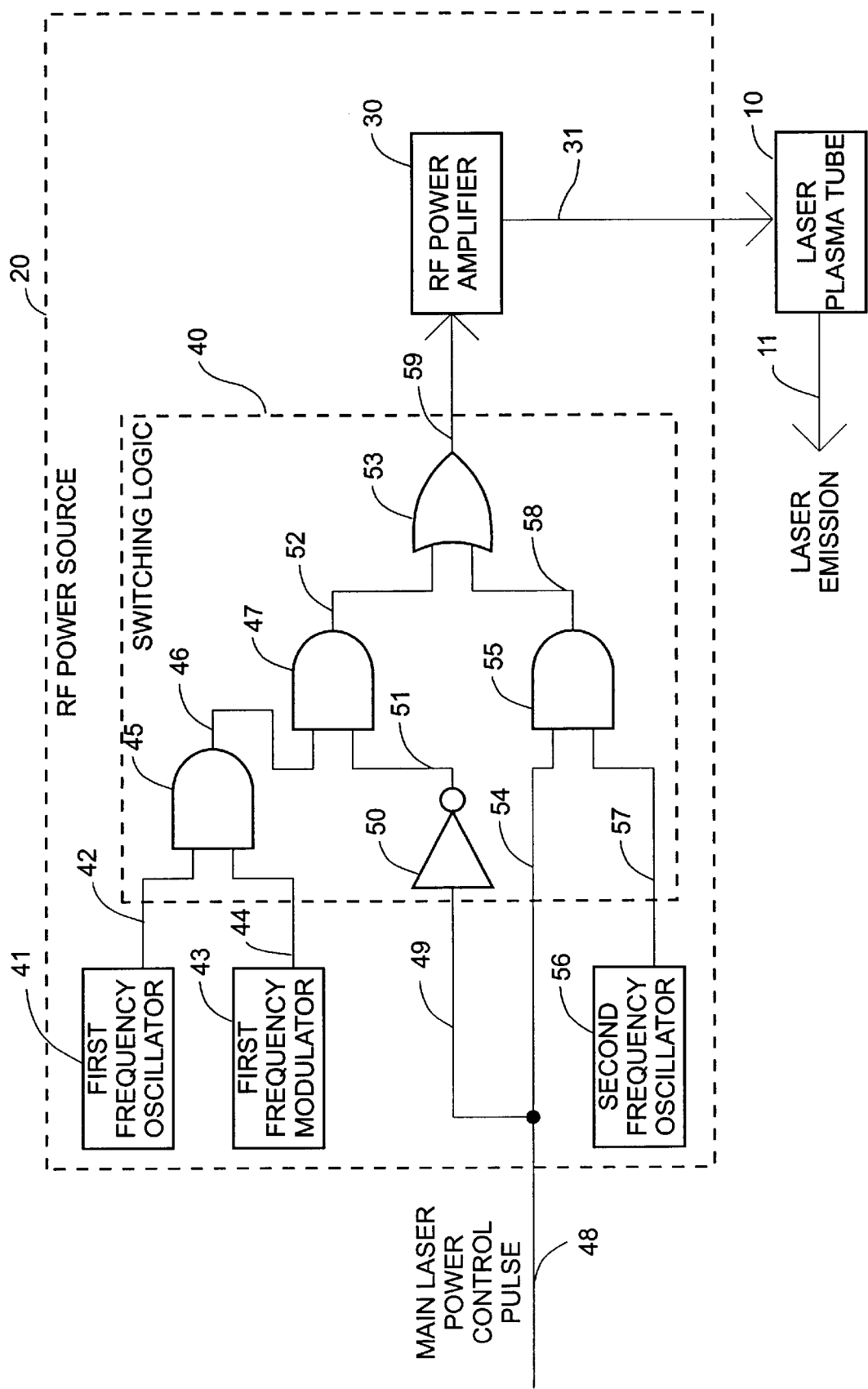
FIG. 2 is a schematic block diagram of a first embodiment of the RF power supply circuit of the present invention using AND and OR gate logic.
Figure 3:
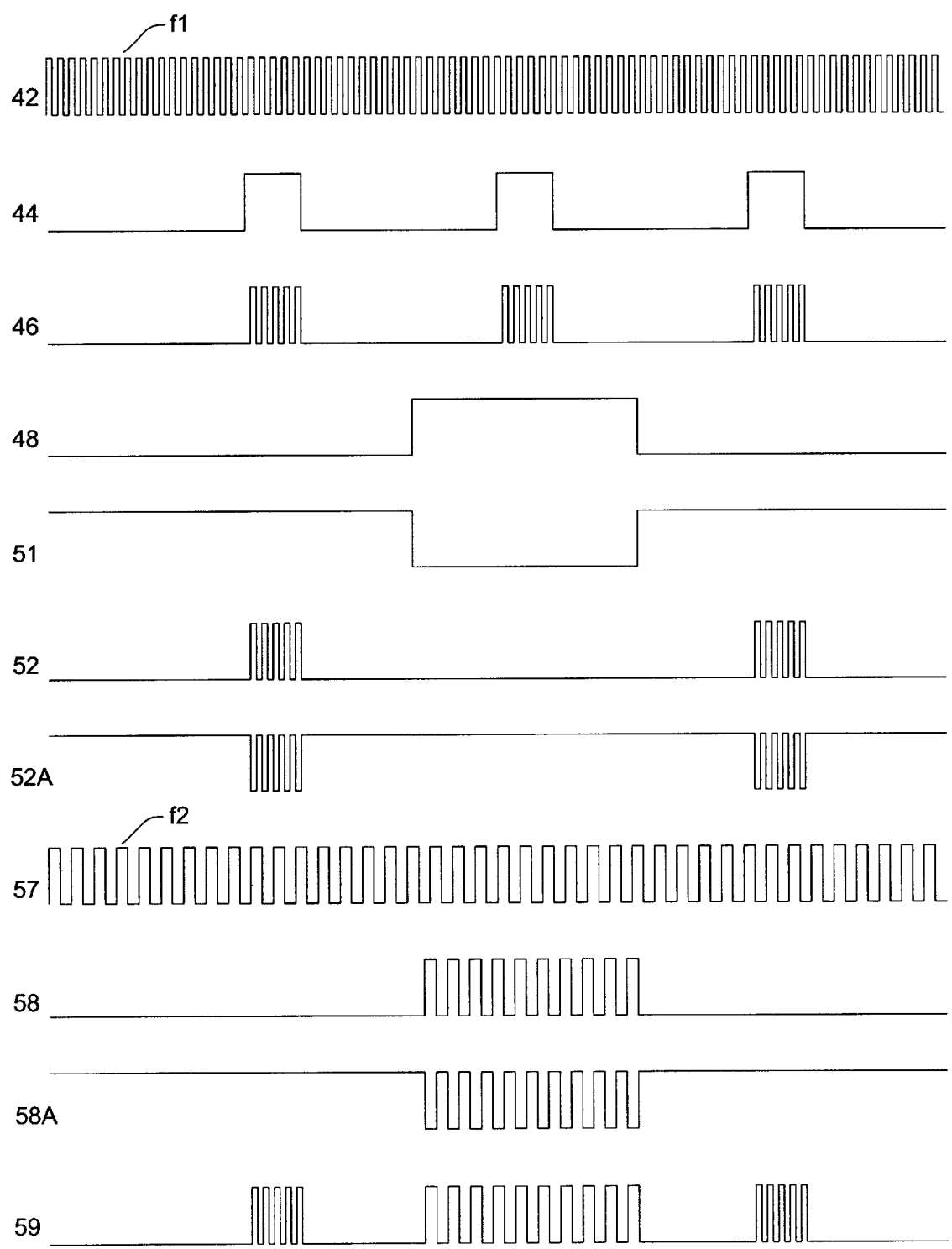
FIG. 3 is a schematic diagram showing the nature and timing of the output signals of each component of the FIGS. 2 and 4 embodiments of an RF power supply circuit of the present invention.

As shown in FIGS. 2, 3 laser plasma tube 10 houses electrodes (not shown) and a laser gas medium (not shown) coupled to an optical resonator (not shown) and has a laser emission threshold. The electrodes are coupled to an RF power source 20 which includes a power amplifier 30 the output 31 of which is coupled to the electrodes for exciting the laser gas medium in response to the application of ignition and main control pulses to provide the laser emissions 11, as more fully described below.

In the FIGS. 2, 3 embodiment, the RF power is supplied to the RF amplifier 30 by a switching logic 40 under the control of main laser power control pulses 48. The frequency of the main laser power control pulses 48 may be any frequency from CW up to about 100 KHz. At CW the laser operates in the ON state continuously. In the example of FIG. 2 the main control pulses 48 have a pulse width of about 10 ms when inverted 50, 51 for inhibiting the pulse modulated RF pulses output 46 which have a much shorter pulse width of about 3 $\mu$s to obtain the laser output 11. FIG. 3.

The switching logic 40 includes a first frequency oscillator 41 having a first frequency output 42 connected to one input of first AND gate 45 the other input of which is connected to the output 44 of first frequency modulator 43. An example of one such first frequency is 41.5 MHz which is the resonance frequency of a particular plasma tube coupled to a particular RF power source prior to plasma ignition used by applicants and which is also the frequency of minimum average RF power required for a reliable ignition of the plasma in the particular plasma tube. First oscillator 41 may be a fixed or variable frequency oscillator, such as, a voltage controlled oscillator or any tunable oscillator circuit.

The modulator 43 in the FIGS. 2, 3 example typically operates in the range of about 1–5 $\mu$s with a pulse repetition rate of about $1 \times 10^3$ to $5 \times 10^3$ pulses per second. These RF pulses, after amplification by the RF power amplifier 30, will have a pulse width, repetition rate, and amplitude which are sufficient for obtaining a reliable ignition of the laser gas medium inside the plasma tube and for sustaining a level of the laser gas medium excitation below the laser emission threshold. The parameters of the RF pulses may be adjusted to compensate for variations in the laser emission threshold for any particular combination of the plasma tube and the optical resonator.

The output 46 of first AND gate 45 is connected to one input of second AND gate 47, the other input of which is connected to the output 51 of inverter 50 which inverts the main laser power control pulses 48, 49. The output 52 of second AND gate 47 is connected to one input of the OR gate 53 the other input of which is connected to the output 58 of third AND gate 55, one input of which is the main laser power control pulses 48, 54 and the other input of which is the output 57 of the second frequency oscillator 56. An example of one such second frequency is 40 MHz. This frequency 57 may be set lower or higher than the first frequency 42. This second frequency 57 is the most efficient operating frequency for the plasma ignited and kept ionized by the pulses of the first frequency 42 thereby providing maximum output laser power. Second oscillator 56 may also be a fixed or variable frequency oscillator, such as, a voltage controlled oscillator or any tunable oscillator circuit.

The gated output pulses 58 are pulses corresponding to the width of the main laser control pulses 48, 54. The output 59 of OR gate 53 is connected to the input of the RF amplifier 30, the output 31 of which is connected to the input of laser plasma tube 10 which produces laser emissions 11 as its output.

The operation of the exemplary circuit of FIG. 2 is described below and the timing and duration of the output pulses are shown in FIG. 3. Oscillator 41 outputs continuous RF pulses at 41.5 MHz which are modulated 46 in first AND gate 45 by the modulator 43 1–5 µs pulse width pulses 44. The modulated pulses 46 are periodically inhibited 52 in second AND gate 47 by the inverted signal 51 10 ms pulse width main laser power control pulses 48, 49. This modulated and inhibited output 52 is applied to OR gate 53. Oscillator 56 outputs continuous RF pulses 57 at 40 MHz which are modulated 58 in third AND gate 55 by the main laser power control pulses 48, 54. This modulated output 58 is also applied to OR gate 53. Pulses 52 and 58 are passed by OR gate 53, are RF amplified 30,31 and applied to the tube 10 to produce output laser emissions 11.

When the 41.5 MHz pulses 52 are present, the laser output is OFF because the energy level of these pulses is below the emission threshold. These pulses provide maximum RF voltage to the plasma tube 10 prior to ignition and the discharge is thereby ignited and the laser gas medium is ionized. When the 40 MHz pulses 58 are present, the laser output is ON because the energy level of these pulses is above the emission threshold providing optimum RF power for sustaining operation of the laser. Thus, OR gate 53 is effectively an RF switch which switches the signals coupled to the RF amplifier between the RF pulses 52 of the first frequency with the laser gas medium excitation below the laser emission threshold for igniting the discharge and the RF pulses 58 of the second frequency with the laser gas medium excitation above the laser emission threshold for producing laser energy.

The switching logic 40 of FIG. 2 is depicted using hardware devices called OR and AND gates and an inverter to show the logical operation of the invention. However, it would be obvious to a person of ordinary skill in the art that any switching function may also be represented in a variety of other ways, such as, using only OR gates and inverters, or using only NAND gates. Using only NAND gates is preferred in the present invention because only a single type device is necessary.

Figure 4:
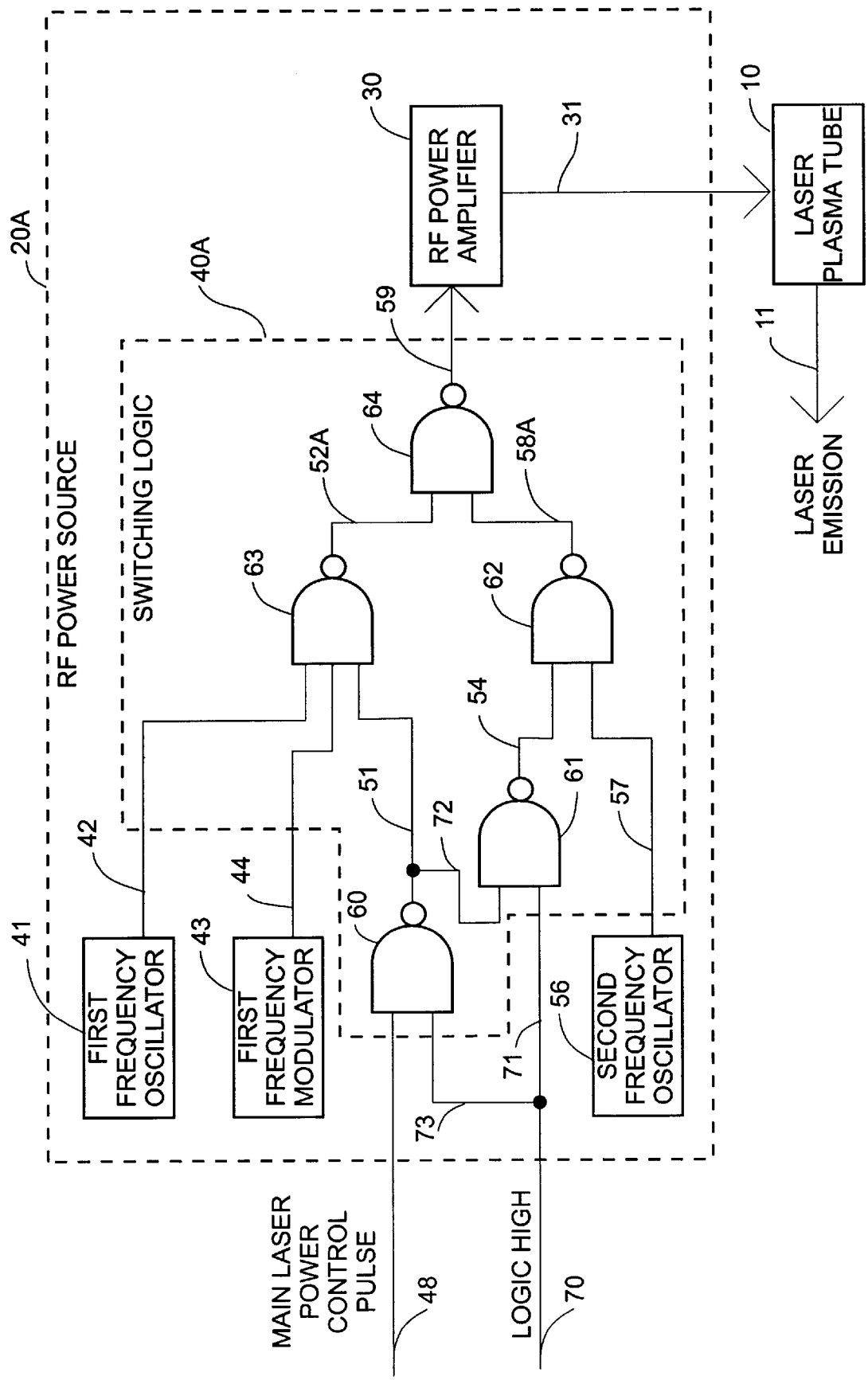
FIG. 4 is a schematic block diagram of a second and preferred embodiment of the RF power supply circuit of the present invention using NAND gate logic.

Accordingly, a second and preferred embodiment of the present invention using NAND gate switching logic is shown in FIG. 4 which is configured similarly to FIG. 2. The input and output signals of FIG. 4 components are shown in FIG. 3. Numerals in FIG. 4 which are identical to the numerals of FIG. 2 are intended to identify components or signals of FIG. 4 which are also identical to the same numbered components or signals of FIG. 2. As is well known in the art, the output of a NAND gate is held high so long as any of its inputs are low, otherwise the output is low.

In FIG. 4 the RF power source 20A provides RF power output 31 from RF power amplifier 30 to the laser plasma tube 10 to produce laser emissions 11 as in FIG. 2. The switching logic 40A, however, provides modulated pulses 52A and 58A as the inputs to the RF power amplifier 30, and, as shown in FIG. 4, pulses 52A and 58A are identical, but inverted, equivalents of their counterpart modulated pulses 52 and 58 of FIG. 2. The pulses 59 from the fifth NAND gate 64 of FIG. 4 are in all respects identical to the pulses 59 from NOR gate 53 of FIG. 2. Thus, the operation of tube 10 is the same in both cases.

In FIG. 4, one input 70 of the first NAND gate 60 is held at a logic high while the main laser power control pulses 48 are applied to the other input. Thus, pulses 51 are the inverted form of pulses 48 as in FIG. 2. The second NAND gate 61 simply re-inverts the pulses 51 to their original form 48, 54 which are used to modulate. The RF pulses 57, as in FIG. 2, with the difference that the output pulses 58A are inverted relative to the pulses 58 of FIG. 2. Similarly, RF pulses 42, modulator pulses 44, and inhibitor pulses 51 are in this case each applied to the three inputs of fourth NAND gate 63 which outputs modulated pulses 52A which are identical to the pulses 52 of FIG. 2 except that the pulses 52A are inverted relative thereto. Pulses 52A, 58A are inputted to fifth NAND gate 64 which outputs pulses 59 identical to pulses 59 of FIG. 2. FIG. 2 is the electrical equivalent of FIG. 4.

The foregoing description of a preferred embodiment and best mode of the invention known to applicants at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An RF excited gas laser comprising:
   a plasma tube containing electrodes and a laser gas medium, coupled to an optical resonator, and having a laser emission threshold,
   an RF power amplifier coupled to the electrodes for exciting the laser gas medium,
   a first frequency oscillator and a second frequency oscillator operating at at least two different frequencies and coupled to the RF power amplifier, the first frequency to provide maximum RF voltage to the plasma tube prior to ignition and the second frequency to provide optimum power for sustaining CW or pulse operation of the laser, a first frequency modulator to control the first frequency oscillator to provide RF power to the plasma tube in the form of RF pulses at the first frequency and at an energy level below the laser emission threshold, and a second frequency modulator to control the second frequency oscillator to supply RF power to the plasma tube in CW or pulse form at the second frequency at a laser gas medium excitation level above the laser emission threshold.

2. The laser of claim 1 wherein the first frequency is the resonance frequency of the plasma tube coupled to the RF power source prior to plasma ignition.

3. The laser of claim 1 wherein the first frequency is the frequency of minimum average RF power required for a reliable ignition of the plasma in the plasma tube.

4. The laser of claim 1 wherein the first frequency is modulated to produce RF pulses with pulse width, repetition rate, and amplitude sufficient to obtain a reliable ignition of the laser gas medium inside the plasma tube and sustain a level of the laser gas medium excitation below the laser emission threshold.

5. The laser of claim 4 wherein the parameters of the RF pulses are adjustable to compensate for variations in the laser emission threshold for a particular combination of the plasma tube and the optical resonator.

6. The laser of claim 1 wherein the second frequency is lower or higher than the first frequency.

7. The laser of claim 1 wherein the second frequency is the most efficient operating frequency for the plasma ignited and kept ionized by the pulses of the first frequency thereby providing maximum output laser power.

8. The laser of claim 1 wherein the first and the second frequency oscillators are fixed frequency oscillators.

9. The laser of claim 1 wherein the first and the second frequency oscillators are variable frequency oscillators.

10. The laser of claim 1 wherein the first or the second frequency oscillator is a fixed oscillator.

11. The laser of claim 1 wherein the first or the second frequency oscillator is a variable frequency oscillator.

12. The laser of claim 1 further comprising:

switching logic coupled to the outputs of the first and the second frequency oscillators to provide switching between the RF pulses of the first frequency for the plasma ignition with the laser gas medium excitation below the laser emission threshold and the RF pulses of the second frequency for laser emission with the laser gas medium excitation above the laser emission threshold.

13. The laser of claim 12 wherein the switching logic further comprises:

main laser power control pulses from a source coupled to an input of the switching logic which inhibit the RF pulses output from the first frequency oscillator when the main laser power control pulses are present.

14. The laser of claim 1 further comprising:

a source of main laser power control signals, and the second frequency modulator having an input device which uses the main laser power control signals for providing an on/off status to the output of the second frequency oscillator.

15. A process of RF exciting a gas laser comprising the steps of:

housing electrodes and a laser gas medium in a plasma tube coupled to an optical resonator and having a laser emission threshold, coupling the electrodes to an RF power amplifier for exciting the laser gas medium, operating a first frequency oscillator and a second frequency oscillator at at least two different frequencies and coupling the outputs of the oscillators to the RF power amplifier, operating a first frequency oscillator and a second frequency oscillator at at least two different frequencies and coupling the outputs of the oscillators to the RF power amplifier, the first frequency providing maximum RF voltage to the plasma tube prior to ignition, and the second frequency providing optimum RF power for sustaining CW or pulse operation of the laser, controlling the first frequency oscillator by modulating its output for providing RF power to the plasma tube in the form of RF pulses at the first frequency and at an energy level below the laser emission threshold, and controlling the second frequency oscillator by modulating its output for supplying RF power to the plasma tube in CW or pulse form at the second frequency at a laser gas medium excitation level above the laser emission threshold.

16. The process of claim 15 wherein the step of operating the first frequency oscillator further comprises the step of:

operating the first frequency at the resonance frequency of the plasma tube coupled to the RF power source prior to plasma ignition.

17. The process of claim 15 wherein the step of operating the first frequency oscillator further comprises the step of:

operating at the frequency of minimum average RF power required for a reliable ignition of the plasma in the plasma tube.

18. The process of claim 15 further comprising the step of:

modulating the first frequency to produce RF pulses with pulse width, repetition rate, and amplitude sufficient to obtain a reliable ignition of the laser gas medium inside the plasma tube and to sustain a level of the laser gas medium excitation below the laser emission threshold.

19. The process of claim 18 further comprising the step of:

adjusting the parameters of the RF pulses to compensate for variations in the laser emission threshold for a particular combination of the plasma tube and the optical resonator.

20. The process of claim 15 further comprising the step of:

setting the second frequency lower or higher than the first frequency.

21. The process of claim 15 wherein the step of operating the second frequency oscillator further comprises the step of:

operating at the most efficient operating frequency for the plasma ignited and kept ionized by the pulses of the first frequency thereby providing maximum output laser power.

22. The process of claim 15 further comprising the step of:

generating the first and the second frequencies using fixed frequency oscillators.

23. The process of claim 15 further comprising the step of:

generating the first and the second frequencies using variable frequency oscillators.

24. The process of claim 15 further comprising the step of:

generating the first or the second frequency using a fixed frequency oscillator.

25. The process of claim 15 further comprising the step of:

generating the first or the second frequency using a variable frequency oscillator.

26. The process of claim 15 further comprising the step of:

switching the outputs coupled to the RF amplifier between the RF pulses of the first frequency with the laser gas medium excitation below the laser emission threshold for igniting the plasma and the RF pulses of the second frequency with the laser gas medium excitation above the laser emission threshold for producing the laser emissions.

27. The process of claim 26 wherein the switching step further comprises the steps of:

coupling to a source of main laser power control pulses, and inhibiting the RF pulses output from the first frequency oscillator when the main laser power control pulses are present.

28. The process of claim 15 wherein the second frequency modulating step further comprises the steps of:

coupling to an external source of main laser power control signals, and using the main laser power control signals for providing an on/off status to the output of the second frequency oscillator.

\* \* \* \* \*